United States Patent
Schmuttermair et al.

(10) Patent No.: US 10,451,182 B2
(45) Date of Patent: Oct. 22, 2019

(54) HYDROSTATIC TRANSMISSION, TRACTION DRIVE HAVING THE TRANSMISSION, AND METHOD FOR CONTROLLING THE TRANSMISSION

(71) Applicant: Robert Bosch GmbH, Stuttgart (DE)

(72) Inventors: Peter Schmuttermair, Gessertshausen (DE); Steffen Mutschler, Neu-Ulm (DE); Horst Wagner, Niederstotzingen (DE)

(73) Assignee: Robert Bosch GmbH, Stuttgart (DE)

( * ) Notice: Subject to any disclaimer, the term of this patent is extended or adjusted under 35 U.S.C. 154(b) by 593 days.

(21) Appl. No.: 15/135,348

(22) Filed: Apr. 21, 2016

(65) Prior Publication Data

US 2016/0312888 A1    Oct. 27, 2016

(30) Foreign Application Priority Data

Apr. 22, 2015    (DE) ........................ 10 2015 207 258

(51) Int. Cl.
| | |
|---|---|
| *F16H 61/472* | (2010.01) |
| *F16H 61/42* | (2010.01) |
| *F16H 39/06* | (2006.01) |
| *F16H 61/4008* | (2010.01) |

(52) U.S. Cl.
CPC .......... *F16H 61/472* (2013.01); *F16H 39/06* (2013.01); *F16H 61/4008* (2013.01); *F16H 61/42* (2013.01)

(58) Field of Classification Search
None
See application file for complete search history.

(56) References Cited

U.S. PATENT DOCUMENTS 9,435,104 B2 *    9/2016    Juricak ................. E02F 9/2079

FOREIGN PATENT DOCUMENTS

| | | |
|---|---|---|
| DE | 10 2012 106 370 A1 | 1/2014 |
| EP | 2 767 739 A1 | 8/2014 |

* cited by examiner

*Primary Examiner* — Thomas E Lazo
*Assistant Examiner* — Michael Quandt
(74) *Attorney, Agent, or Firm* — Maginot, Moore & Beck LLP

(57) ABSTRACT

A hydrostatic transmission for a traction drive includes a first hydraulic machine that is coupled to a drive machine and that has an adjustable displacement volume and a second hydraulic machine that is fluidically connected to the first hydraulic machine and that is coupled to a drive output of the traction drive. At the first hydraulic machine, a control pressure acts in the direction of an enlargement of its displacement volume and a working pressure of the second hydraulic machine acts in the opposite direction. The hydrostatic transmission further includes a control device that varies the control pressure to influence a torque of the second hydraulic machine. The control device stores a characteristic map by which a setpoint control pressure is determined as a function of a setpoint torque and a displacement volume of the second hydraulic machine so as to regulate the torque of the second hydraulic machine.

15 Claims, 2 Drawing Sheets ard hydrost
HYDROSTATIC TRANSMISSION, TRACTION DRIVE HAVING THE TRANSMISSION, AND METHOD FOR CONTROLLING THE TRANSMISSION This application claims priority under 35 U.S.C. § 119 to patent application no. DE 10 2015 207 258.4, filed on Apr. 22, 2015 in Germany, the disclosure of which is incorporated herein by reference in its entirety.

BACKGROUND

The disclosure relates to a hydrostatic transmission, a traction drive having the transmission, and a method for regulating a drive output torque of the transmission.

The laid-open specification DE 10 2012 106 370 A1 has disclosed a hydrostatic drive with a hydrostatic transmission with an adjustable hydraulic pump and an adjustable hydraulic motor, which are arranged in a closed hydraulic circuit. In order to regulate a working pressure of the circuit within admissible limits, and in order to protect a drive machine (diesel engine) against overloading owing to excessively high torques, the pressure is regulated. This is performed without a pressure sensor arrangement. Instead, the working pressure is determined in model-based fashion from a volume flow balance of the hydraulic pump and of the hydraulic motor, more precisely from a volume flow difference between the two machines. Traction, neutral or braking operation of the drive machine is likewise inferred from the volume flow difference. A different setpoint working pressure of the circuit arises depending on the operating mode. Said setpoint working pressure corresponds to a setpoint volume flow difference. The two, the balanced volume flow difference and the setpoint volume flow difference, are compared, and the resulting deviation is input as a corrective factor into the actuation of the displacement volumes of the hydraulic pump and of the hydraulic motor. Here, the control signals of the adjustment devices of the two machines are used as actual values of the displacement volumes, such as are required for the balancing.

A disadvantage of this is that even a very small error in the controlled displacement volume, assumed as actual value, of the hydraulic pump or of the hydraulic motor can lead to considerable deviations in the working pressure of the circuit. At the same time, however, the dynamics of the pressure change are very high. The described pressure regulation by way of the variation of the displacement volumes furthermore requires a very short cycle time, of approximately one millisecond, for the actuation. In practice, it has been found that the displacement volume of the hydraulic motor must be detected by way of a sensor, because errors in the displacement volume of the hydraulic motor have a severe effect on the volume flow balance.

The European patent application EP 2 767 739 A1 presents a power-split hydrostatic drive in a closed circuit with an adjustable hydraulic pump and a hydraulic motor. Here, owing to the type of construction of the hydraulic pump, the working pressure of the circuit counteracts an enlargement of a displacement volume of the hydraulic pump. In a manner dependent on definable traction ranges of the drive, for example slow working travel or fast service travel, a relatively low (working travel) or relatively high (service travel) control or setting pressure is provided to the hydraulic pump for adjustment of its displacement volume. The control pressure, which counteracts the working pressure, is thus a measure for the working pressure beyond which the displacement volume of the hydraulic pump is reduced in size. Thus, by way of the setting of the control pressure, it is possible for the working pressure, and therefore a torque and, at a given rotational speed, a power, to be limited.

By contrast, it is the object of the disclosure to provide a hydrostatic transmission with a more precisely controllable drive output torque. The disclosure is also based on the object of providing a traction drive having the transmission, and a method for controlling the transmission.

SUMMARY

The objects are achieved by way of a hydrostatic transmission, a hydrostatic traction drive that includes the transmission, and a method for regulating a drive output torque of the transmission, each having the features of the disclosure.

Advantageous refinements of the hydrostatic transmission and the method are described in the dependent claims.

A hydrostatic transmission, in particular for a traction drive, has a first hydraulic machine which can be coupled, in particular is coupled, to a drive machine, in particular an internal combustion engine, for example a diesel engine. Said first hydraulic machine has an adjustable displacement volume $V_{HP}$. Furthermore, the transmission has a second hydraulic machine which can be fluidically connected to the first hydraulic machine, in particular in a closed hydraulic circuit. Said second hydraulic machine can be coupled, in particular is coupled, to a drive output of the traction drive. Here, at the first hydraulic machine, a control pressure $p_{St}$ acts in the direction of an enlargement of the displacement volume $V_{HP}$ and a working pressure p, which is dependent on the adjustment, of the second hydraulic machine acts in the opposite direction, that is to say in the direction of a reduction in size of the displacement volume $V_{HP}$. Furthermore, the transmission has a control device by means of which the control pressure $p_{St}$ can be varied in order to influence a torque $M_{HM}$ of the second hydraulic machine. Here, in the control device, there is stored a characteristic map by means of which, for the regulation of the torque $M_{HM}$ of the second hydraulic machine, a setpoint control pressure $p_{Stsoll}$ can be determined as a function of a setpoint torque $M_{HMsoll}$ and a displacement volume $V_{HM}$ of the second hydraulic machine.

As already mentioned above, at the first hydraulic machine, the control pressure $p_{St}$ counteracts the working pressure p resulting from the adjustment. In other words, the first hydraulic machine exhibits a relationship, which can be uniquely represented in a characteristic map and which is presented in the solution, between said two pressures. Said relationship is now utilized in targeted fashion for the purposes of precisely regulating the torque $M_{HM}$ of the second hydraulic machine. The setpoint torque $M_{HMsoll}$ may in this case be predefined for example by a transmission controller or a drive controller, or may alternatively or additionally be predefined by an operator, for example by way of a joystick or accelerator pedal.

The characteristic map may be realized in the form of a table, of tables or of empirical equations.

In one possible embodiment, the first hydraulic machine is in the form of an adjustable axial piston machine of swashplate type of construction, and has working pistons which rotate with a drive shaft, which working pistons are supported on a swashplate which is pivotable about a pivot axis. Here, the drive shaft can preferably be coupled to the drive machine. The swashplate is preferably articulated at a distance, relative to the pivot axis, from an adjustment device which can be charged with control pressure medium.

The control pressure $p_{St}$ is in this case that of the control pressure medium. By way of a control disk through which at least two kidney-shaped pressure ports extend, it is possible for hydrostatic working chambers, which are delimited by the working pistons, of the first hydraulic machine to be connected, for a flow of pressure medium, alternately to the low-pressure side and the high-pressure side of said hydraulic machine. The control disk is preferably arranged so as to be twisted about its longitudinal axis, such that at least one of the kidney-shaped pressure ports is arranged so as to be distributed asymmetrically in relation to a plane which is spanned by the pivot axis and by the axis of rotation of the working chambers, or by lines parallel thereto. In this way, as already mentioned, the working pressure p acts in a direction for a reduction in size of the displacement volume $V_{HP}$.

In one refinement, the transmission has at least one pressure regulating or pressure reduction valve, by way of which the control pressure $p_{St}$ can be regulated in accordance with the setpoint control pressure $p_{Stsoll}$.

In one refinement, in the characteristic map, the control pressure $p_{St}$ is stored as a function of the working pressure p and as a function of the displacement volume $V_{HP}$ of the first hydraulic machine and as a function of a rotational speed $n_{HP}$ or a rotational speed range of the first hydraulic machine.

In one refinement, in the characteristic map, the control pressure $p_{St}$ is stored for traction operation or alternatively or additionally for braking operation of the second hydraulic machine. Here, traction operation refers to an operating mode in which the energy flow is directed from the second hydraulic machine to the drive output of the traction drive, and braking operation defines the reverse situation, in which the energy flow runs from the drive output of the traction drive to the second hydraulic machine. The characteristic map preferably comprises the values for traction operation and braking operation, such that the torque $M_{HM}$ at the second hydraulic machine can be precisely regulated in both operating modes.

In a preferred refinement, the displacement volume $V_{HP}$ of the first hydraulic machine is adjustable to both sides of a zero position and the control pressure $p_{St}$ is stored in the characteristic map, as a function of said displacement volume $V_{HP}$, to both sides of the zero position. Here, a displacement volume of zero of the first hydraulic machine is defined as zero or neutral position. In the case of the axial piston machine of swashplate type of construction, this is the case, for example, at a pivot angle of 0°. Alternatively, the first hydraulic machine may self-evidently be designed such that the displacement volume can be adjusted only to one side of the zero position. By way of the adjustability to both sides, simple reversibility of the transmission or of the traction drive is realized.

Particularly precise determination of the displacement volume of the first hydraulic machine is possible if, for this purpose, the transmission has a sensor for detecting the displacement volume of the first hydraulic machine $V_{HP}$. Said sensor detects for example a pivot angle of the swashplate or an adjustment travel of an adjustment device of the first hydraulic machine, from which the displacement volume of the first hydraulic machine can then be determined.

In one refinement, the transmission has in each case one rotational speed detection unit for detecting a rotational speed $n_{HP}$ of the first hydraulic machine and a rotational speed $n_{HM}$ of the second hydraulic machine. Here, the rotational speed detection unit may be set up to directly detect the rotational speeds $n_{HP}$, $n_{HM}$ of the hydraulic machines, or to detect rotational speeds dependent thereon, such as arise for example from transmission speed ratios.

The detection of the rotational speeds $n_{HP}$, $n_{HM}$ makes it possible to determine a volume flow Q of the transmission as a function of the rotational speed $n_{HM}$ of the second hydraulic machine and as a function of the displacement volume $V_{HM}$ of the second hydraulic machine. The relationship for this is $Q = n_{HM} V_{HM}$.

In one refinement, the displacement volume $V_{HM}$ of the second hydraulic machine is constant, such that it is always known and can be input as a constant into the calculations of the control unit for the determination of the volume flow Q. In an alternative refinement, the displacement volume $V_{HM}$ of the second hydraulic machine is adjustable, in particular adjustable in controllable fashion. In this case, the displacement volume $V_{HM}$ can be derived, in particular by the control device, from a setpoint value signal $V_{HMsoll}$ of an adjustment device of the second hydraulic machine. In this way, no sensor is required for providing the displacement volume $V_{HM}$ of the second hydraulic machine. In particular, the displacement volume $V_{HM}$ of the second hydraulic machine may be controlled in electromagnetic, in particular electroproportional fashion. Then, from a setting current or a setting voltage, the present displacement volume $V_{HM}$ of the second hydraulic machine can be directly inferred. Alternatively or in addition, it is self-evidently possible for the displacement volume $V_{HM}$ of the second hydraulic machine to be detected, similarly to the $V_{HP}$ of the first, by way of a detection unit.

In one refinement, for the control unit, the displacement volume $V_{HP}$ of the first hydraulic machine can be determined as a function of the volume flow Q and as a function of the detected rotational speed $n_{HP}$ of the first hydraulic machine. The relationship for this is $V_{HP} = n_{HP}/Q$.

In one refinement, with the thus determined displacement volume $V_{HP}$ of the first hydraulic machine, it is possible, by way of the control unit, for a setpoint working pressure $p_{soll}$ to be determined as a function of the setpoint torque $M_{HMsoll}$ of the second hydraulic machine and as a function of the displacement volume $V_{HM}$ of the second hydraulic machine. The relationship for this is $p_{soll} = f(M_{HMsoll}/V_{HM})$.

It is the object of the first hydraulic machine to regulate the working pressure p in accordance with the setpoint working pressure $p_{soll}$, such that the setpoint torque $M_{HMsoll}$ is obtained. For this purpose, for the adjustment of the displacement volume $V_{HP}$ of the first hydraulic machine, knowledge of the control pressure $p_{St}$, which is dependent on the working pressure p, is necessary.

Therefore, in one refinement, by way of the control unit, the setpoint control pressure $p_{Stsoll}$ can be determined from the characteristic map as a function of the previously determined setpoint working pressure $p_{soll}$ and as a function of the displacement volume $V_{HP}$ of the first hydraulic machine and as a function of the rotational speed $n_{HP}$ thereof.

In one refinement, the transmission has a pressure detection unit for detecting the working pressure p, and has a closed pressure regulating loop with a low regulation gain, whereby the regulation is made more precise.

In one refinement, by way of the control unit, the displacement volume $V_{HM}$ of the second hydraulic machine can be controlled as a function of the rotational speed $n_{HM}$ of the second hydraulic machine. In this way, it is for example possible, as a function of the rotational speed $n_{HM}$, for the displacement volume $V_{HM}$ to be reduced in stepped fashion, similarly to a switching function, with increasing rotational speed $n_{HM}$.

In one refinement, an interval of the displacement volume $V_{HP}$ of the first hydraulic machine is parameterized in the control unit, which interval has a maximum displacement volume $V_{HPmax}$ as an upper limit. Here, by way of the control unit, in order to increase the rotational speed $n_{HM}$ of the second hydraulic machine, a reduction in size of the displacement volume $V_{HM}$ of the second hydraulic machine is provided within the interval, and an enlargement of the displacement volume $V_{HP}$ of the first hydraulic machine is provided outside the interval. This prevents a situation in which the first hydraulic machine, by way of the adjustment of which the working pressure is regulated, always operates with an adequate margin to its maximum displacement volume $V_{HPmax}$ and thus to its setting variable limitation. It is thereby ensured that adequate adjustment freedom exists for its regulation intervention for the regulation of the working pressure. This would not be the case if the displacement volume $V_{HP}$ of the first hydraulic machine were adjusted as far as the setting variable limitation for the purposes of increasing the rotational speed $n_{HM}$ of the second hydraulic machine.

A power-split transmission has at least one power branch which is formed by a hydrostatic transmission as per one of the preceding aspects of the description. All of the stated advantages also apply here to said power-split transmission. However, the significance specifically of the four-quadrant operation, in which the control pressure $p_{St}$ is regulated both in traction operation and in braking operation and both for negative and for positive displacement volumes $V_{HP}$ of the first hydraulic machine, is even greater than in the case of the purely hydrostatic transmission as per the description above. This arises from the fact that the power-split transmission, depending on concept, is operated only in a first transmission quadrant even in all four quadrants.

The applicant reserves the right to direct a patent claim or a patent application to a power-split transmission of said type.

A traction drive has a hydrostatic transmission which is designed in accordance with at least one aspect of the preceding description. Here, the second hydraulic machine is coupled to a drive output of the traction drive, for example to an axle or to a wheel, and the first hydraulic machine is coupled to a drive machine, for example to an internal combustion engine, in particular to a diesel engine.

A method for regulating the torque of the second hydraulic machine of a hydrostatic transmission which is designed in accordance with one of the aspects of the preceding description has a step of determining the setpoint control pressure $p_{Stsoll}$ as a function of the setpoint torque $M_{HMsoll}$ and as a function of the displacement volume $V_{HM}$ of the second hydraulic machine by way of the control unit from the characteristic map. Here, for carrying out the method, at least one of the two stated rotational speed detection units is required, such that, by way of the control unit, with the displacement volume $V_{HM}$ of the second hydraulic machine known from the setpoint value signal $V_{HMsoll}$ of the second hydraulic machine, and the rotational speed $n_{HM}$ of said second hydraulic machine, the volume flow Q can be determined by way of the control unit. From said volume flow Q and the detected rotational speed $n_{HP}$ of the first hydraulic machine, the displacement volume $V_{HP}$ of the first hydraulic machine can then be determined.

In a preferred refinement, in a method, a step of determining the setpoint working pressure $p_{soll}$ as a function of the setpoint torque $M_{HMsoll}$ of the second hydraulic machine and as a function of the displacement volume $V_{HM}$ of the second hydraulic machine by way of the control unit is provided. Furthermore, in said refinement, a step of determining the setpoint control pressure $p_{Stsoll}$ from the characteristic map as a function of the setpoint working pressure $p_{soll}$ and as a function of the displacement volume $V_{HP}$ of the first hydraulic machine and as a function of the rotational speed $n_{HP}$ of the first hydraulic machine is provided.

Then, by way of the abovementioned pressure regulating or pressure reduction valve, the control pressure $p_{St}$ can be regulated by way of the control unit such that the demanded setpoint torque $M_{HM}$ is regulated.

In one refinement, in order to increase a rotational speed $n_{HM}$ of the second hydraulic machine within the abovementioned interval, the method has a step of reducing the displacement volume $V_{HM}$ of the second hydraulic machine. As already mentioned, in this way, the stated rotational speed increase is not effected by way of an increase of the displacement volume $V_{HP}$ of the first hydraulic machine, such that the first hydraulic machine operates with adequate adjustment reserves of its displacement volume $V_{HP}$ for the regulation of the working pressure p.

BRIEF DESCRIPTION OF THE DRAWINGS

An exemplary embodiment of a traction drive according to the disclosure having a hydrostatic transmission according to the disclosure, and a method for controlling the transmission, are illustrated in the drawings. The disclosure will now be discussed in more detail on the basis of the figures of said drawings.

In the drawings.

DETAILED DESCRIPTION

Figure 1:
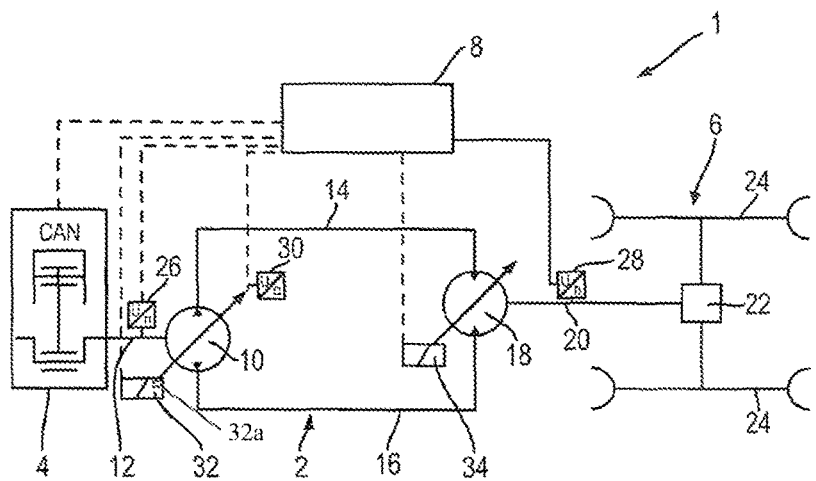
FIG. 1 shows a hydraulic circuit diagram of the exemplary embodiment.

As per FIG. 1, a hydrostatic traction drive 1 has a hydrostatic transmission 2, a drive machine 4, a drive output 6 and a control unit 8.

The hydrostatic transmission 2 has a first hydraulic machine 10 with adjustable displacement volume, said first hydraulic machine being designed as an axial piston machine of swashplate type of construction. Said first hydraulic machine is coupled by way of a drive shaft 12 to the drive machine 4. The first hydraulic machine 10 is fluidically connected in a closed hydraulic circuit to a second hydraulic machine 18 via a first and a second working line 14 and 16. The second hydraulic machine 18 is coupled by way of a drive shaft 20 to a mechanical transmission 22 of the drive output 6. The mechanical transmission 22 is coupled to two drive output axles 24 of the drive output 6.

The transmission 2 has a first rotational speed detection unit 26 for detecting a rotational speed $n_{HP}$ of the first hydraulic machine 10 and a second rotational speed detection unit 28 for detecting a rotational speed $n_{HM}$ of the second hydraulic machine 18. Furthermore, the transmission 2 has a pivot angle detection unit 30 by way of which a pivot angle α of the first hydraulic machine 10 can be detected.

The first hydraulic machine 10 has an adjustment device 32 which can be charged with control pressure medium, wherein a control pressure acts, via the adjustment device 32, in the direction of an enlargement of the displacement volume $V_{HP}$ of the first hydraulic machine 10, and the working pressure p prevailing in the working lines 14 or 16 acts in the direction of a reduction in size of the displacement volume $V_{HP}$ of the first hydraulic machine 10. This is achieved, in the exemplary embodiment shown, by way of a twist of a control disk (not illustrated) of the first hydraulic machine 10.

The second hydraulic machine 18 has an electroproportionally controlled adjustment device 34 by way of which the displacement volume $V_{HM}$ of the second hydraulic machine 18 can be controlled.

Figure 2:
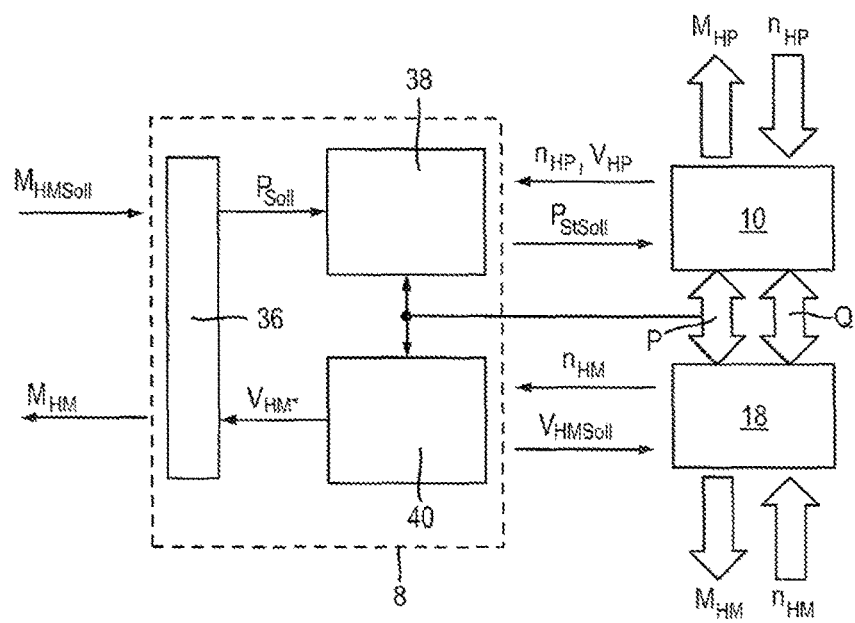
FIG. 2 shows a block diagram of a method according to the disclosure for regulating the drive output torque $M_{HM}$ in interaction with the hydraulic machines of the transmission of the traction drive as per FIG. 1.

FIG. 2 illustrates the mode of operation of the control unit 8 as per FIG. 1 in interaction with the first hydraulic machine 10 and the second hydraulic machine 18.

The traction drive 1 as per FIG. 1 is regulated in torque-based fashion, making possible to realize a natural driving feel, for example in a passenger motor vehicle.

Here, the position of a setpoint value transducer, for example an accelerator pedal, is for example proportional to the available torque of the drive machine 4.

The action of the control unit 8 makes it possible, for example, to realize direct influencing of a traction force characteristic of the traction drive 1 in all four quadrants.

Alternatively or in addition, there may be stored in the control unit 8 a characteristic which permits a greater traction force, that is to say a greater torque $M_{HM}$ of the second hydraulic machine 18, during forward travel than during reverse travel.

Alternatively or in addition, by way of the control unit 8, a limitation of the torque $M_{HM}$ is implemented by the driver by way of an HMI, for example if the pavement surface is sensitive.

Alternatively or in addition, by way of the control unit 8, braking is performed with a constant torque $M_{HM}$ or with a brake characteristic of any desired form.

It is also possible by way of the control unit 8 to realize driving with a minimum required torque $M_{HM}$, and immediate stoppage if a traveling resistance increases, for example in order to prevent damage when maneuvering.

A parameterization of the traction drive 1 is possible on the basis of vehicle-related parameters, such that no software skills are necessary.

For example, a maximum starting torque $M_{HMmax}$ may be stored in parameterized form in the control unit 8 for the purposes of influencing driving dynamics of the traction drive 1.

It is also possible for a drag torque of the traction drive 1 during coasting to be stored in parameterized form, in order to permit maneuvering using the accelerator pedal alone, or in order to realize fuel consumption-optimized coasting operation of the traction drive.

A further advantage of the traction drive 1 according to the disclosure and of the transmission 2 according to the disclosure is that the torque $M_{HM}$ of the second hydraulic machine 18, regulated in accordance with the setpoint torque $M_{HMsoll}$, is, in the case of a known rotational speed $n_{HM}$, proportional to a regulated power $P_{HM}$. Thus, a power demand is known before it arises. Correspondingly, it is for example possible for a power management system of a hybrid system or power-split transmission to decide whether and how said power $P_{HM}$ is provided jointly by the internal combustion engine and for example by an electric machine in order to optimize fuel consumption.

As per FIG. 2, the control unit 8 receives, as input variables, the demanded setpoint torque $M_{HMsoll}$, the rotational speed $n_{HP}$ of the first hydraulic machine 10, as detected by the rotational speed detection unit 26, and the rotational speed $n_{HM}$ of the second hydraulic machine 18, as detected by the rotational speed detection unit 28. Said input variables are minimum prerequisites for the regulation of the torque $M_{HM}$ of the second hydraulic machine 18 by way of the control unit 8.

The second hydraulic machine 18, which in the exemplary embodiment shown is in the form of a hydraulic motor that can be operated in 4-quadrant operation, exhibits proportional, in particular electroproportional, control of its displacement volume $V_{HM}$. Accordingly, a setpoint value $V_{HMsoll}$, output by the module 40 of the control unit 8, of the displacement volume $V_{HM}$ substantially corresponds to the actual displacement volume $V_{HM}$. Since this is however not a detected but an assumed value of the displacement volume $V_{HM}$ of the second hydraulic machine 18, said value will hereinafter be designated $V_{HM}^*$.

Firstly, by way of the control unit 8 and the pressure/torque calculation module 36 thereof, the relationship $M_{HMsoll} = P_{soll} V_{HM}^*$ is used for determining the setpoint working pressure $p_{soll}$ as a function of the setpoint torque $M_{HMsoll}$ and the present displacement volume $V_{HM}^*$ of the second hydraulic machine 18. Furthermore, the control unit 8 uses the relationship $Q = n_{HM} V_{HM}^*$ and the detected rotational speed $n_{HP}$ for determining the present displacement volume $V_{HP}$ of the first hydraulic machine 10. The determined values $p_{soll}$ and $V_{HP}$ and the detected rotational speed $n_{HP}$ of the first hydraulic machine 10 are input into a pressure regulation module 38 of the control unit 8. In said pressure regulation module there is stored a characteristic map of the control pressure $p_{St}$ as a function of the working pressure p, in this case as a function of the setpoint working pressure $p_{soll}$, and as a function of a relative displacement volume $v_{HP}$ ($v_{HP} = V_{HP}/V_{HPmax}$) of the first hydraulic machine 10 at a given rotational speed $n_{HP}$.

For example, assume that the relative displacement volume $v_{HP}$ is presently 0.5, that is to say the displacement volume $V_{HP}$ is presently at half of its maximum $V_{HPmax}$. Assume also that the demanded or setpoint torque $M_{HMsoll}$ at the present displacement volume $V_{HM}$ of the second hydraulic machine 18 yields a setpoint working pressure $p_{soll}$ of 300 bar. As per the characteristic map in FIG. 3, the setpoint control pressure $p_{Stsoll}$ then emerges from the ordinate of the diagram. The setpoint control pressure $p_{Stsoll}$ thus determined is input as a setpoint value into the adjustment device 32 of the first hydraulic machine 10 as per FIG. 1, which has a pressure regulation valve 32a. By way of the pressure regulation valve 32a, the control pressure $p_{St}$ is regulated to the corresponding value, whereby this acts at the pivot cradle of the first hydraulic machine 10. In accordance with the simultaneously acting working pressure p, the pivot cradle of the first hydraulic machine 10 experiences a force imbalance, and a corresponding adjustment of its displacement volume, until force equilibrium at the pivot cradle is restored.

Figure 3:
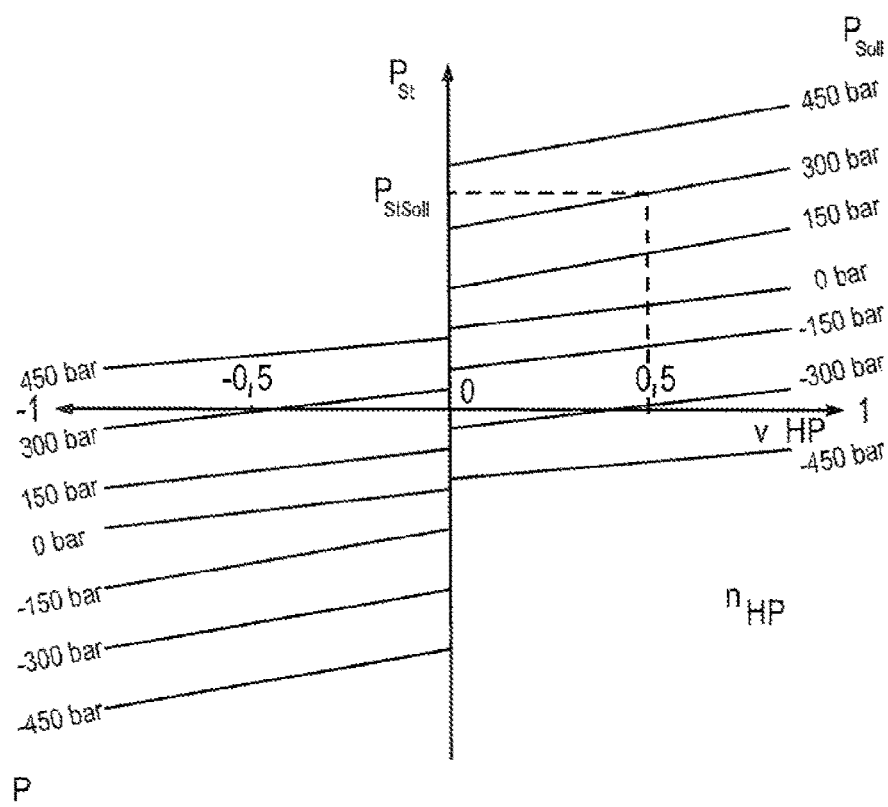
FIG. 3 shows a characteristic map of the setpoint control pressure $p_{Stsoll}$ as a function of the working pressure p of the hydrostatic transmission and as a function of the displacement volume $V_{HP}$ of the first hydraulic machine, which is coupled to the drive machine, of the transmission.

As per FIG. 3, the set of curves from 0 to 450 bar for positive relative displacement volumes $v_{HP}$ of the first hydraulic machine 10 corresponds to traction operation during forward travel, the set of curves from 0 to −450 bar in the case of positive relative displacement volumes $v_{HP}$ corresponds to braking operation during forward travel, the set of curves from 0 to 450 bar in the case of negative relative displacement volumes $v_{HP}$ of the first hydraulic machine 10 corresponds to braking operation during reverse travel, and the remaining set of curves from 0 to −450 bar in the case of negative displacement volumes $v_{HP}$ of the first hydraulic machine 10 corresponds to traction operation during reverse travel. The curve of 0 bar in this case represents torque-free coasting operation during forward or reverse travel.

To further improve the calculation of the control unit and the precision thereof, the pivot angle detection unit 30 is provided as already mentioned, which pivot angle detection unit renders the calculation of the displacement volume $V_{HP}$ by way of the control unit 8, if desired, superfluous.

Furthermore, in FIG. 2, the working pressure p is illustrated as a detected value (this is optional) which is input as an input variable into the respective module 38 and 40. The exchange of the setpoint torque $M_{HMsoll}$ and of the torque $M_{HM}$ with the surroundings can be referred to as traction strategy interface.

The exchange of the rotational speeds $n_{HP}$, $n_{HM}$, of the displacement volumes $V_{HP}$, $V_{HM}$, and of the determined setpoint control pressure $p_{Stsoll}$ described immediately above, with the hydraulic machines 10 and 18 can be referred to as component control interface.

An exemplary embodiment of a regulation method according to the disclosure for the torque $M_{HM}$ of the second hydraulic machine 18 is stored, for execution, in the modules 36, 38 and 40 of the control unit 8.

LIST OF REFERENCE DESIGNATIONS

1 Hydrostatic traction drive
2 Hydrostatic transmission
4 Drive machine
6 Drive output
8 Control unit
10 First hydraulic machine
12 Drive shaft
14 Working line
16 Working line
18 Second hydraulic machine
20 Drive shaft
22 Mechanical transmission
24 Axle
26 Rotational speed detection unit
28 Rotational speed detection unit
30 Pivot angle detection unit
32 Hydrostatic adjustment device
34 Electroproportional adjustment device
36 Pressure/torque calculation
38 Pressure regulation
40 Controller of second hydraulic machine
$n_{HP}$ Rotational speed of first hydraulic machine
$n_{HM}$ Rotational speed of second hydraulic machine
$V_{HP}$ Displacement volume of first hydraulic machine
$V_{HM}{}^*$ Displacement volume of second hydraulic machine
$V_{HMsoll}$ Setpoint displacement volume of second hydraulic machine
$M_{HP}$ Torque of first hydraulic machine
$M_{HMsoll}$ Setpoint torque of second hydraulic machine
$M_{HM}$ Torque of second hydraulic machine
Q Volume flow
p Working pressure
$p_{soll}$ Setpoint working pressure
$p_{Stsoll}$ Setpoint control pressure

What is claimed is:

1. A hydrostatic transmission for a traction drive, comprising:
a first hydraulic machine coupled to a drive machine and having an adjustable displacement volume;
a second hydraulic machine configured to be (i) fluidically connected to the first hydraulic machine and (ii) coupled to a drive output of the traction drive; and
a control device by which a control pressure is configured to be adjusted in order to regulate a torque of the second hydraulic machine,
wherein, at the first hydraulic machine, the control pressure acts in the direction of an enlargement of the displacement volume of the first hydraulic machine, and a working pressure of the second hydraulic machine, which is dependent on the adjustment of the control pressure, acts in the opposite direction, and
wherein the control device stores a characteristic map by which a setpoint control pressure for the control pressure is configured to be determined as a function of a setpoint torque and a displacement volume of the second hydraulic machine, and of the displacement volume of the first hydraulic machine, in order to regulate the torque of the second hydraulic machine.

2. The hydrostatic transmission according to claim 1, wherein the control pressure is stored in the characteristic map as a function of the working pressure and as a function of the displacement volume of the first hydraulic machine and as a function of one or more of a rotational speed and a rotational speed range of the first hydraulic machine.

3. The hydrostatic transmission according to claim 1, wherein the control pressure is stored in the characteristic map for one or more of traction operation and braking operation of the second hydraulic machine.

4. The hydrostatic transmission according to claim 1, wherein the displacement volume of the first hydraulic machine is adjustable to both sides of a zero position and, in the characteristic map, the control pressure is stored to both sides of the zero position.

5. The hydrostatic transmission according to claim 1, further comprising:
a first rotational speed detection unit configured to detect a rotational speed of the first hydraulic machine; and
a second rotational speed detection unit configured to detect a rotational speed of the second hydraulic machine.

6. The hydrostatic transmission according to claim 1, wherein, by way of the control device, a volume flow of the transmission is configured to be determined as a function of a rotational speed of the second hydraulic machine and as a function of the displacement volume of the second hydraulic machine.

7. The hydrostatic transmission according to claim 6, wherein, by way of the control device, the displacement volume of the first hydraulic machine is configured to be determined as a function of the rotational speed of the first hydraulic machine and as a function of the volume flow.

8. The hydrostatic transmission according to claim 1, wherein, by way of the control device, a setpoint working pressure is configured to be determined as a function of the setpoint torque of the second hydraulic machine and as a function of the displacement volume of the second hydraulic machine.

9. The hydrostatic transmission according to claim 8, wherein, by way of the control device, the setpoint control pressure is configured to be determined from the characteristic map as a function of the setpoint working pressure and as a function of the displacement volume of the first hydraulic machine and as a function of a rotational speed of the first hydraulic machine.

10. The hydrostatic transmission according to claim 1, further comprising a pressure detection unit configured to detect the working pressure.

11. The hydrostatic transmission according to claim 1, wherein, by way of the control device, the displacement volume of the second hydraulic machine is configured to be controlled as a function of a rotational speed of the second hydraulic machine.

12. The hydrostatic transmission according to claim 11, wherein:
- an interval of the displacement volume of the first hydraulic machine is parameterized in the control device, the interval having a maximum displacement volume as an upper limit, and
- by way of the control device, in order to increase the rotational speed of the second hydraulic machine, a reduction in size of the displacement volume of the second hydraulic machine is performed within the interval, and an enlargement of the displacement volume of the first hydraulic machine is performed outside the interval.

13. A hydrostatic traction drive, comprising:
a hydrostatic transmission including:
a first hydraulic machine coupled to a drive machine and having an adjustable displacement volume;
a second hydraulic machine configured to be (i) fluidically connected to the first hydraulic machine and (ii) coupled to a drive output of the traction drive; and
a control device by which a control pressure is configured to be varied in order to regulate a torque of the second hydraulic machine,
wherein, at the first hydraulic machine, the control pressure acts in the direction of an enlargement of the displacement volume of the first hydraulic machine, and a working pressure of the second hydraulic machine, which is dependent on the adjustment of the control pressure, acts in the opposite direction, and
wherein the control device stores a characteristic map by which a setpoint control pressure for the control pressure is configured to be determined as a function of a setpoint torque and a displacement volume of the second hydraulic machine, and of the displacement volume of the first hydraulic machine, in order to regulate the torque of the second hydraulic machine.

14. A method for regulating a torque of a second hydraulic machine of a hydrostatic transmission, the hydrostatic transmission including a first hydraulic machine having an adjustable displacement volume and a control device by which a control pressure is configured to be varied in order to influence the torque of the second hydraulic machine, the second hydraulic machine configured to be fluidically connected to the first hydraulic machine, the method comprising:
- determining a setpoint control pressure as a function of a setpoint torque and as a function of a displacement volume of the second hydraulic machine by way of a characteristic map stored in the control device, including;
- determining a setpoint working pressure as a function of the setpoint torque of the second hydraulic machine and as a function of the displacement volume of the second hydraulic machine, and
- determining the setpoint control pressure from the characteristic map as a function of the setpoint working pressure and as a function of the displacement volume of the first hydraulic machine and as a function of a rotational speed of the first hydraulic machine.

15. The method according to claim 14, wherein:
- by way of the control device, the displacement volume of the second hydraulic machine is configured to be controlled as a function of a rotational speed of the second hydraulic machine,
- an interval of the displacement volume of the first hydraulic machine is parameterized in the control device, the interval having a maximum displacement volume as an upper limit, and
- in order to increase the rotational speed of the second hydraulic machine within the interval, the method further comprises reducing the displacement volume of the second hydraulic machine.

* * * * *